C. L. POORMAN.
THRASHING-MACHINE.

No. 175,873. Patented April 11, 1876.

Attest:
Ja. M. Rees
George Coswell

Inventor:
Christian L. Poorman

UNITED STATES PATENT OFFICE.

CHRISTIAN L. POORMAN, OF BELLAIRE, OHIO.

IMPROVEMENT IN THRASHING-MACHINES.

Specification forming part of Letters Patent No. 175,873, dated April 11, 1876; application filed February 7, 1876.

*To all whom it may concern:*

Be it known that I, CHRISTAIN L. POORMAN, of Bellaire, Belmont county, in the State of Ohio, have invented an Adjustable Side Hanger for Miter-Gear Shaft on Thrashing-Machines, of which the following is a specification:

The object of my invention is to rapidly and conveniently change the line of the miter-wheel or "side-gear shaft" on a thrashing-machine from a horizontal position to any desired angle, without changing the working relation of the cogs or teeth on the miter-gear wheels, thereby making the line of the miter-gear shaft conform to the line of "tumbling-rod," or shaft running from horse-power to thrashing-machine, and reducing the friction and wear of the coupling by which the side-gear shaft and tumbling-rod are joined.

The following is a full and accurate description of my invention, reference being had to the accompanying drawings, making part of this specification.

Figure 1:
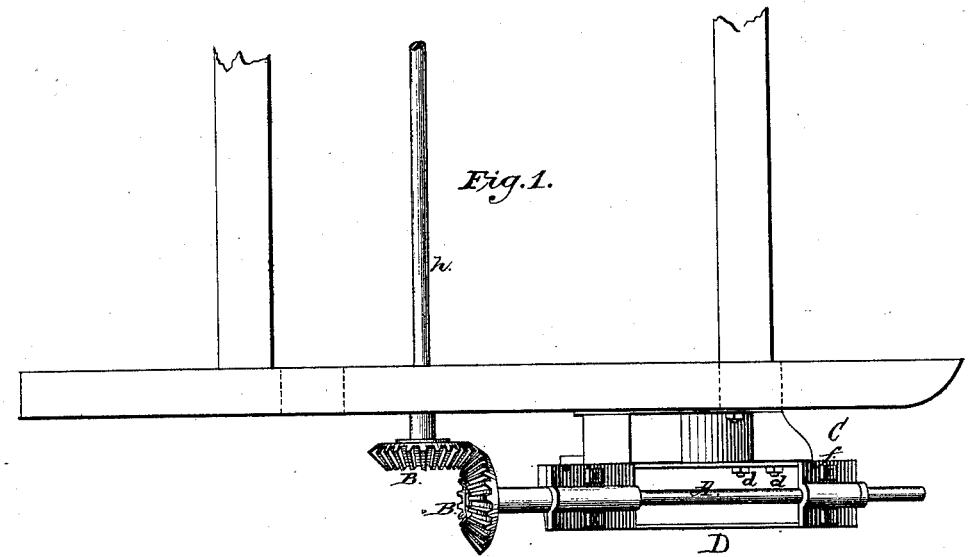
Figure 2:
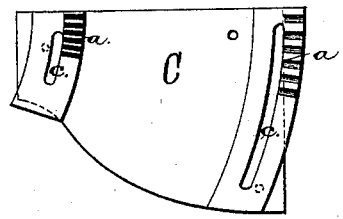
Figure 3:
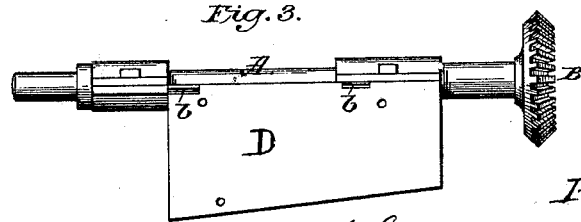

Figure 1 is a plan view of the hanger, shafts, and miter-wheels as in use when set at an angle; Fig. 2, a face view of the inner part of the hanger, showing the radiating grooves and slotted holes for bolts; Fig. 3, a back view of the outer part of the hanger, showing the tongues or V's corresponding with the radiating grooves in Fig. 2, and the bolt-holes, &c.

The main features of my invention consist in the two parts, Fig. 2, bolted to the machine as a base for the parts shown in Fig. 3, and Fig. 3, containing the bearings for miter-gear shaft, and the radiating grooves $a\ a$, Fig. 2, the radiating tongues or V's $b\ b$, Fig. 3, and the slotted holes $c\ c$, Fig. 2.

The plate C, Fig. 2, which is the base to be bolted to the machine, is provided with elevated flanges, on the outer face of which are radiating grooves $a\ a$, which are formed by drawing diverging lines from the center of the "through-shaft" $h$, as shown in Fig. 1, to the front of plate C at $f$, and the slots $c\ c$, the screw-threaded bolts or rods $d$, which secure plate C to the frame, the slots $c\ c$ being made in the form of arcs of circles drawn from the center of shaft $h$, and hanger D being secured in place by tightening the nuts on the bolts $d$.

The hanger D, Fig. 3, which contains the bearings for the miter-gear shaft A, has upon its upper inner edge tongues or V's $b\ b$, corresponding with and made to fit into the radiating grooves $a\ a$ in plate C. The tongues $b\ b$, when the hanger D is attached to the plate C, are intended to fit into any of the grooves $a\ a$, and keep the shaft A, to which is attached miter-wheel B, in working relation to the through-shaft $h$, no matter at what angle of depression the short shaft A may be placed.

I claim as my invention—

1. The combination of plate C, formed with radiating grooves $a\ a$, and hanger D, provided with the tongues $b\ b$, substantially as and for the purpose set forth.

2. The plate C, formed with radiating grooves $a\ a$ and arc-formed slots $c\ c$, in combination with the hanger D, having the tongues $b\ b$ and bolts $d$, substantially as set forth.

CHRISTIAN L. POORMAN.

Witnesses:
 JAS. M. REES,
 GEORGE CRISWELL.